United States Patent [19]

Biondetti et al.

[11] 4,106,405
[45] Aug. 15, 1978

[54] CONTROLLED DEFLECTION ROLL

[75] Inventors: Mario Biondetti; Ignazio Marchioro, both of Schio, Italy

[73] Assignee: Escher Wyss Limited, Zürich, Switzerland

[21] Appl. No.: 812,280

[22] Filed: Jul. 1, 1977

[30] Foreign Application Priority Data

Jul. 13, 1976 [CH] Switzerland .................. 8947/76

[51] Int. Cl.² .................. B30B 3/04; B21B 13/02
[52] U.S. Cl. .................. 100/162 B; 100/170; 29/116 AD; 72/243
[58] Field of Search .................. 100/35, 162, 162 B, 100/170, 176; 29/116 R, 116 AD, 113 R, 113 AD; 72/20, 241–243

[56] References Cited

U.S. PATENT DOCUMENTS

| | | | |
|---|---|---|---|
| 3,389,450 | 6/1968 | Robertson | 29/116 AD |
| 3,802,044 | 4/1974 | Spillman et al. | 29/113 AD |
| 3,997,953 | 12/1976 | Christ et al. | 29/116 AD |
| 4,058,877 | 11/1977 | Lehmann | 29/116 AD |

*Primary Examiner*—Peter Feldman

*Attorney, Agent, or Firm*—Werner W. Kleeman

[57] ABSTRACT

A controlled deflection roll comprising a fixed support and a hollow shell rotatable about the support and displaceable relative to the support in the direction of a pressure plane. Between the support and the shell there is located at least one hydrostatic pressure or contact element which is effective in the pressure plane and serves for oppressing the roll shell against a counter roll and thus for forming the pressure force of the roll. Additionally, there is provided at least one hydrostatic lift-off element which is effective in the opposite direction with respect to the contact or pressure element and serves for lifting-off the roll shell from the counter roll. The contact element and the lift-off element can be connected by hydraulic lines or conduits to a source of hydraulic pressurized fluid medium. A control device or means serves for the selective connection of a conduit of the contact element or the lift-off element with the source of hydraulic pressurized fluid medium and for simultaneously connecting the conduit of the element disconnected from the source with a drainage or outflow line or conduit.

8 Claims, 6 Drawing Figures

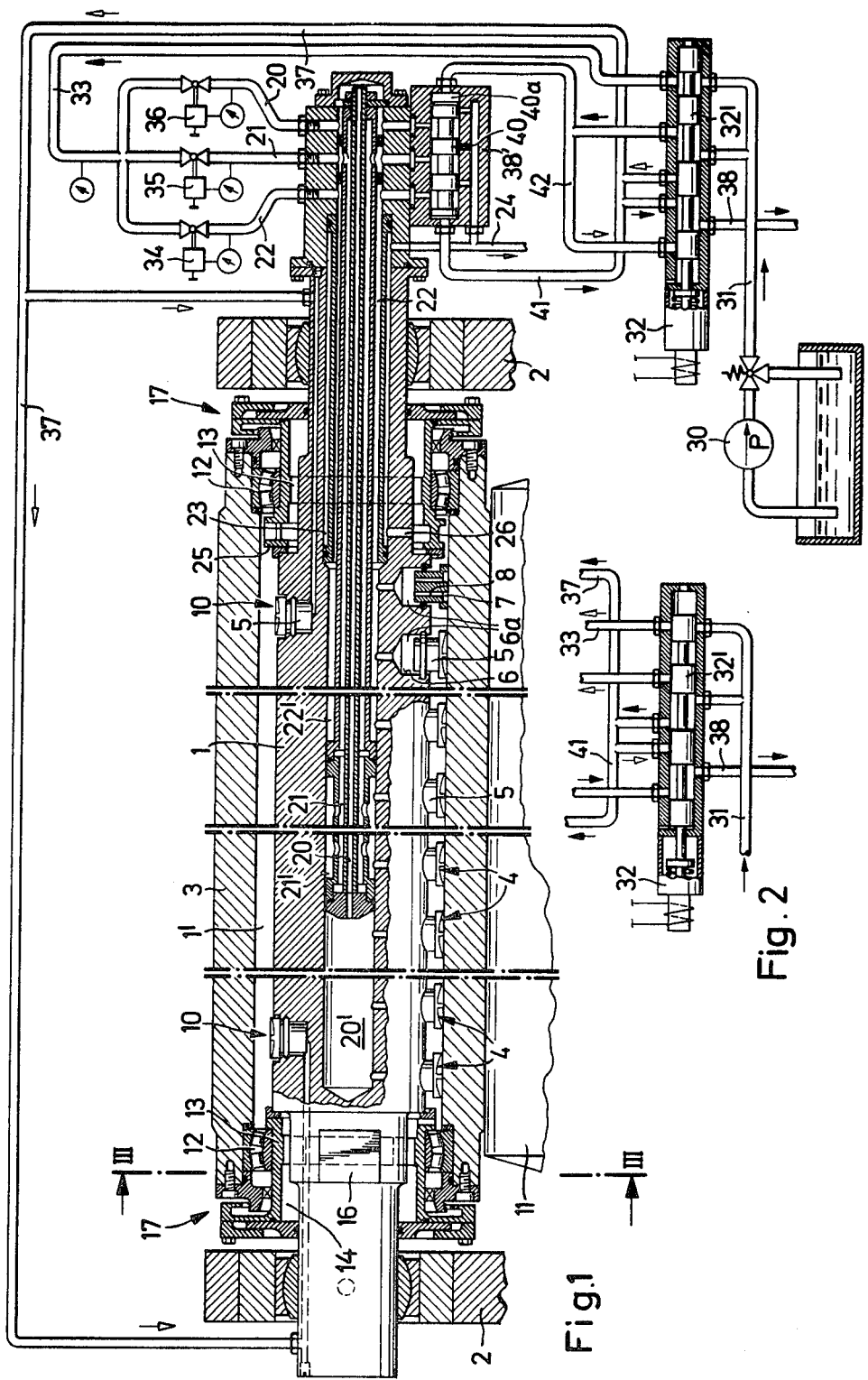

CONTROLLED DEFLECTION ROLL

BACKGROUND OF THE INVENTION

The present invention relates to a new and improved construction of controlled deflection roll — sometimes referred to in the art as a roll with bending compensation — which is of the type comprising a fixed support and a hollow shell rotatable about said fixed support and displaceable relative to the support in the direction of a pressure plane, at least one hydrostatic contact or pressure element being located between the fixed support and the roll shell. This contact or pressure element is effective in the pressure plane and serves to press the roll shell against a counter roll and thus for producing the pressure or contact force of the roll, there also being provided at least one hydrostatic lift-off element which is effective in the opposite direction to the contact element and serves for lifting-off the roll shell from the counter roll, and the contact element and the lift-off element are connectable by hydraulic lines or conduits with a source of hydraulic pressurized fluid medium.

Such type roll construction has been disclosed to the art, for instance, in U.S. Pat. Nos. 3,802,044 and 3,885,283, the respective disclosures of which are incorporated herein by reference.

When the prior art controlled deflection rolls are employed in rolling or roller mills, which must be rapidly opened for operational reasons, and wherein the roll shell must be rapidly moved away from the counter roll, then difficulties exist in terms of the drainage or outflow of the hydraulic liquid in the usual manner from the contact or pressure elements, thereby delaying opening of the roller or rolling mill.

SUMMARY OF THE INVENTION

Hence, with the foregoing in mind, it is a primary object of the present invention to provide an improved construction of controlled deflection roll which is not associated with the aforementioned drawbacks and limitations of the prior art proposals.

Another and more specific object of the present invention aims at improving upon the prior art controlled deflection rolls for the purpose of achieving a more rapid lift-off movement of the roll shell than was heretofore possible.

Now in order to implement these and still further objects of the invention, which will become more readily apparent as the description proceeds, the controlled deflection roll of the present invention is manifested by the features that there is provided a control device or means for the selective connection of a line or conduit of a contact or pressure element or a lift-off element with the source of hydraulic pressurized fluid medium and for simultaneously connecting or flow communicating the line of the element disconnected from the source with an outflow or drainage line.

The control device provided by the invention renders possible, by carrying out a simple switching movement in the case of a roll which is positioned in its contact or pressure position, a rapid switching-over of the contact or pressure element to the lift-off element and at the same time establishing a connection of the contact element with the outflow or drainage line or conduit, so that the liquid which is in the contact or pressure element and in the associated conduit or line thereof can rapidly flow off.

It is preferable if the control device or means contains a control valve or spool valve which connects the source of hydraulic pressurized fluid medium and the outflow conduit with the conduits or lines of the contact element and the lift-off element. The control valve or spool valve can be electromagnetically actuated.

With such construction of the control device there is obtained with very little force a remotely-actuatable device, which, for instance, can be connected with a monitoring device.

In the case of a roll containing a plurality of contact or pressure elements which may be connected by separate lines or conduits to different sources of hydraulic pressurized fluid medium operating at different pressures, there can be provided a second control device or means which can be conjointly actuated with the first control device. The second control device serves for the simultaneous connection of the lines or conduits of the contact or pressure elements with a common outflow line or for the simultaneous disconnection of the lines or conduits of the contact elements from the outflow line or conduit. Due to this measure there is realized with very simple means a rapid lift-off movement also for such type controlled deflection roll.

The second control device can be constituted by a control valve or spool valve which is positionally adjustable by means of the first control device.

The second control device also can contain hydraulically actuated valves which are arranged in the connection conduits or lines leading from the lines for the pressurized fluid medium to the outflow line and held in closed position by the action of the pressure of the hydraulic pressurized fluid medium when the latter is delivered to the lift-off elements.

In order to connect the conduit or line of the contact element with the outflow line or conduit there can be, however, also provided at least one shutoff element which serves to shutoff or open respectively, a channel which opens from the conduit in the intermediate space or chamber between the fixed support and the roll shell. In this way there can be accomplished a particularly rapid drainage or emptying of the conduit, something which is especially of importance in the previously mentioned instance where a number of contact or pressure elements or groups of contact elements are connectable to different sources of hydraulic fluid medium by separate lines or conduits. On the one hand, there is accomplished in the shortest possible path emptying of the intermediate space between the support and the roll shell and, on the other hand, there are avoided irregular flow resistances which are possible when employing a number of conduits or lines. In the case of irregular flow resistances the danger exists of irregular or non-uniform lift-off motion of the roll shell, so that for instance, one end is more rapidly lifted-off than the other end. From the intermediate space between the roll shell and the support the effluxing hydraulic liquid can be delivered in conventional manner to the outflow or drainage line or conduit for the liquid which departs during the normal operation.

The shutoff element, in this case, can be especially advantageously actuated electromagnetically. However, it is to be understood that there can be likewise conceivably employed, for instance, hydraulic actuation.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a sectional view of a controlled deflection roll equipped with hydraulic circuitry and constructed according to the present invention;

FIG. 2 illustrates a first control valve or spool valve in another position from that shown in FIG. 1;

DETAILED DESCRIPTION OF THE PREFERRED EMBODIMENTS

Figure 4:
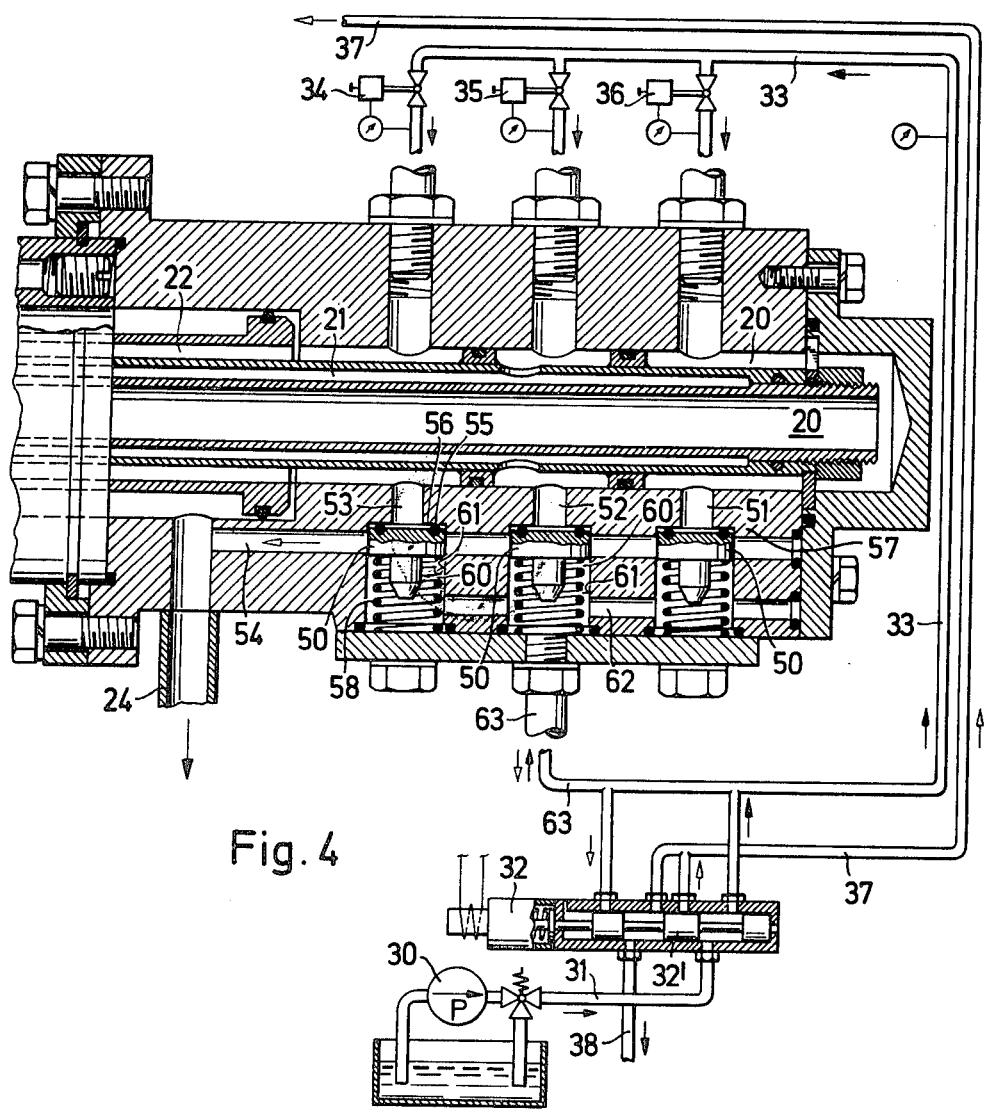
FIG. 4 is a partial section of the right end of the arrangement of FIG. 1, shown on an enlarged scale, illustrating a different embodiment of the second control device, as well as also its hydraulic circuitry.

Describing now the drawings, in FIG. 1 there is illustrated a sectional view of a controlled deflection roll having piston-like hydrostatic contact or pressure elements 4, which may be constructed for instance in the manner disclosed in any one of the aforementioned U.S. Pat. Nos. 3,802,044, 3,855,283 or the commonly assigned, copending U.S. application, Ser. No. 738,561, filed Nov. 3, 1976, now U.S. Pat. No. 4,047,273, the disclosure of which is incorporated herein by reference.

The illustrated piston-like contact or pressure elements 4 simultaneously serve for the hydrostatic mounting of the sliding movement of the roll shell 3 at the support 1, i.e. for forming a hydrostatic lubricant film between the contact surfaces of the contact or pressure elements 4 and the contact surface of the roll shell 3. However, it is to be understood that it would be also possible to employ hydrostatic contact or pressure elements having hydrodynamic bearing means or supports between the contact element and the roll shell, for instance as taught in U.S. Pat. No. 3,119,324 and German patent publication No. 1,947,927, the disclosures of which are incorporated herein by reference.

The controlled deflection roll illustrated in FIG. 1 will be seen to contain a stationary or fixed support 1 which is mounted in the support elements 2. Rotatable about the support 1 is the roll shell 3 and, as will be explained more fully hereinafter, this roll shell 3 can be displaced in a pressure or contact plane. Between the fixed support 1 and the roll shell 3 there are located the hydrostatic contact or pressure elements 4 which contain pistons 5 which are appropriately sealingly guided in the cylinder bores 6. The pistons 5 are equipped with hydrostatic bearing pockets 7 which are connected by means of the throttle channels 8 with the cylinder space 6a of the related cylinder bore 6. Similar elements 10 are arranged in the support 1, offset through 180°, and serve as lift-off elements for moving the roll shell 3 in upward direction of FIG. 1.

The contact or pressure elements 4, which serve to press the roll shell 3 against a counter roll 11, constitute one possible constructional embodiment of such elements. It is to be understood however that also other known constructional embodiments can be employed, thus, for instance, as taught in the aforementioned U.S. Pat. No. 3,802,044 there can be used a single ledge-like contact or pressure element.

Figure 3:
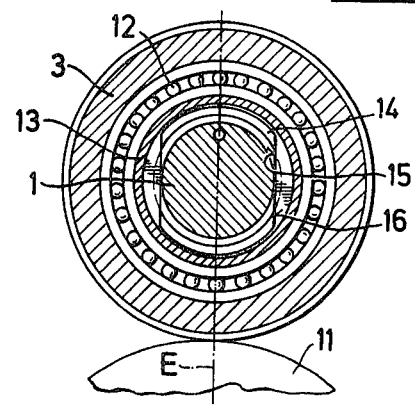
FIG. 3 is a cross-sectional view of the arrangement of FIG. 1, taken substantially along the line III—III thereof.

As will be apparent from the showing of FIGS. 1 and 3, the ends of the roll shell 3 are rotatably mounted with the aid of the roller bearings 12 upon the guide parts or components 13. The guide parts 13 contain an elongate opening 14 which is bounded by flat side surfaces 15. The guide parts 13 are guided with the aid of the guide surfaces 15 along likewise flat guide surfaces 16 of the fixed support 1.

The guide parts 13 in this manner thus enable a displacement of the roll shell 3 in relation to the support 1 in a pressure plane E (FIG. 3), where there are also simultaneously effective the contact elements 4 and the lift-off elements 10.

At the end of the roll shell 3 there are arranged the connection devices 17 which serve for closing off towards the outside the hollow space 1' located between the roll shell 3 and the support 1 and to prevent any escape of the hydraulic liquid. These closure devices do not constitute part of the subject matter of the present development and therefore need not be considered further herein.

According to the illustration of FIG. 1, the hydrostatic contact or pressure elements 4 are subdivided into three groups, to which there is delivered the hydraulic pressurized fluid medium or liquid by means of the concentric channels 20, 21 and 22. Additionally, there is provided a further, outer concentric channel 23 for the outflow or withdrawal of the hydraulic liquid from the intermediate space 1' between the shell 3 and the support 1. In the outer channel 23, from where there outwardly leads an outflow or drainage line 24, the hydraulic liquid arrives by means of a collecting ring 25 and radial bores 26 in the support 1. Details of the exact construction of the concentric tubes or channels and the collecting ring have been disclosed and constitute subject matter of the aforementioned U.S. patent application Ser. No. 738,516 and also U.S. patent application Ser. No. 738,442, filed Nov. 3, 1976, now U.S. Pat. No. 4,048,701, the disclosure of which is incorporated herein by reference.

In order to actuate the controlled deflection roll illustrated in FIG. 1, there is provided as the source for the pressurized fluid medium, for instance pressurized oil, a pump 30. This pump 30 conveys the hydraulic liquid at an appropriate pressure into a conveying conduit or feed line 31 which is part of a first control valve or spool valve 32. With the illustrated position of the control valve 32 the conveying conduit or line 31 is connected with a conduit or line 33 which leads to the hydraulic contact or pressure elements. Prior to connection or flow communication with the contact or pressure elements 4 the conduit 33 branches-off in accordance with the three zones or grouping of the contact elements 4 into three branch conduits or lines 20, 21, 22 with which there are connected the pressure regulators 36, 35 and 34 respectively. The pressure regulators 34, 35 and 36 allow for a desired adjustment of the pressure at the contact or pressure elements 4 and thus the contact force of the individual zones of the controlled deflection roll.

The lift-off elements 10, in turn, are connected with a conduit or line 37 which can be connected by means of the control valve 32 with the conveying conduit or line 31 of the pump 30. With the position of the valve spool 32' of the control valve or spool valve 32 shown in FIG. 1, the conduit or line 37 is however connected with a drainage line or conduit 38 and thus is not under pressure.

Furthermore, at the right end of the support 1, as best seen by referring to FIG. 1, there is attached a control housing 38' which contains a second control valve or spool valve 40. The control valve 40 serves for opening and closing, respectively, a connection between the lines or conduits 20, 21, 22 and the drain or outflow line 24. As will also be further apparent from the showing of FIG. 1, the cylinder spaces or chambers 40a at the ends of the control valve 40 are connectable by means of the first control valve 32 through the agency of the conduits 41 and 42 either with the delivery or conveying conduit 31 of the pump 30 or with the outflow or drainage conduit 38. The arrangement is carried out such that in each instance one position of the first control valve 32 also corresponds to a position of the second control valve 40. It should be understood that both control valves 32 and 40 also may be mechanically interconnected with one another. During normal operation, which corresponds to the illustrated position of the control valves 32 and 40, the conduit or line 33 is connected with the delivery or conveying conduit 31 of the pump 30. The conduit 37 of the lift-off elements 10 is connected, in turn, with the outflow conduit or line 38. The conduit 42 is pressurized, since it is likewise connected with the delivery or conveying conduit 31, as shown. The conduit 41 is without pressure and flow communicates with the drain or outflow conduit 38. The control valve 40 is located in the illustrated position and closes the connection between the conduits 20, 21, 22 and the outflow conduit or line 24.

Now if the roll shell 3 should be suddenly lifted-off the counter roll 11, then, for instance, by electrical actuation, the first control valve 32 is brought into the position of FIG. 2. Consequently, the connection between the conduits or lines 31 and 33 is interrupted and the conduit 37 of the lift-off elements 10 is connected with the delivery or conveying conduit 31 of the pump 30. At the same time the second control valve 40 is switched, i.e. due to its movement is brought from the position shown in FIG. 1 towards the right into the position of FIG. 2. Consequently, there is established the flow communication or connection of the conduits 20, 21 and 22 with the drain or outflow line 24.

In this manner there is interrupted, on the one hand, the inflow of the pressurized fluid medium to the pressure regulators 34, 35 and 36 as well as the channels 20, 21 and 22. At the same time, these channels 20, 21 and 22 are connected with the drain or outflow line 24, so that there is possible a rapid drainage or outflow of the liquid located in the cylinder bores 6 and in the channels 20, 21 and 22. On the other hand, pressurized fluid medium or liquid is delivered from the delivery or conveying line 31 to the conduit or line 37, with the result that the pistons 5 of the lift-off elements 10 are moved upwards in the showing of FIG. 1 and the roll shell 3 is lifted-off of the counter roll 11. A rapid lift-off movement is thus possible inasmuch as the liquid can flow without hindrance out of the channels 20, 21 and 22.

The embodiment of FIG. 4 differs from that shown in FIGS. 1 to 3 in that the second control valve or spool valve 40 is replaced by piston-like valve bodies or valve means 50. The valve bodies 50 serve to close the channels 51, 52 and 53 which lead outwardly from the channels 20, 21 and 22 respectively, and for their connection with a connection channel 54 which opens into the drain or outflow conduit 24.

As illustrated in FIG. 4, the valve bodies 50 are provided with sealing rings 55 which serve to seal the corresponding valve body 50 in relation to a related shoulder 56 provided in the housing 57. The valve bodies 50 are pressed by springs 58 against these shoulders 56.

Additionally, the spaces 60 of the bores 61, in which there are movable the valve bodies 50, are interconnected with one another by a bore 62. One of the spaces 60 is connected by means of a conduit or line 63 with the conduit or line 33 which leads to the pressure regulators 34, 35 and 36. As in the previous embodiment, there can be established or interrupted the flow communication or connection of the conveying line 31 of the pump 30 with the line or conduit 33. In the same manner, the line or conduit 37 can be connected with the line 31 or with the drain or outflow line 38. In the event of interruption of the connection between the lines or conduits 31 and 33, i.e. when the line 37 of the lift-off elements is connected with the delivery conduit or feed line 31, then, with the illustrated arrangement of the control valve 32, the conduit or line 33 is connected with the drain or outflow conduit 38.

The mode of operation of the apparatus according to FIG. 4 is essentially like that of the apparatus considered heretofore with respect to the description of FIGS. 1 to 3. In the illustrated position of the first control valve 32 the conduit 33 is connected with the delivery or conveying conduit 31 of the pump 30, so that the channels 20, 21 and 22 have delivered thereto the pressurized liquid or fluid medium at the pressure governed by the pressure regulators 34, 35 and 36. The conduit 37 of the lift-off elements 10 is without pressure, since it is connected with the drain or outflow line 38.

Now if for instance an electrical pulse moves the valve spool of the control valve 32 to the left of FIG. 4, then the connection of the conduit 33 with the conduit 31 is interrupted and the conduit 33 is connected with the outflow or drain line 38. At the same time the conduit or line 37 of the lift-off elements is disconnected from the drain or outflow line 38 and flow connected with the delivery or conveying line 31 of the pump 30.

Now when the conduit or line 33 is pressurized then the contact or pressure elements 4 press the roll shell 3 against the counter roll 11 with the desired pressing or contact force. At the same time, due to the pressure which is effective in the spaces or chambers 60 the pistons 50 are pressed by means of their sealing rings 55 against the shoulders 56 and close the channels 51, 52 and 53. The pressure acting from above upon the valve bodies 50 is smaller than the original pressure in the conduit 33 due to the action of the regulators 34, 35 and 36. Additionally, the springs 58 also act in the closing direction.

As soon as the roll shell should be lifted-off the counter roll, then the spaces or chambers 60 are connected by means of the control valve 32 with the drain or outflow line 38. The lift-off elements 10, which move the roll shell of FIG. 1 upwards, produce a rearward movement of the contact or pressure elements 4, so that the liquid is displaced out of the bores 6 and the channels 20, 21 and 22. The liquid moves the valve bodies 50 against the force of the springs 58 downwardly and thus opens the channel 54 through which such liquid can flow off to the drain or outlet conduit or line 24.

Figure 5:
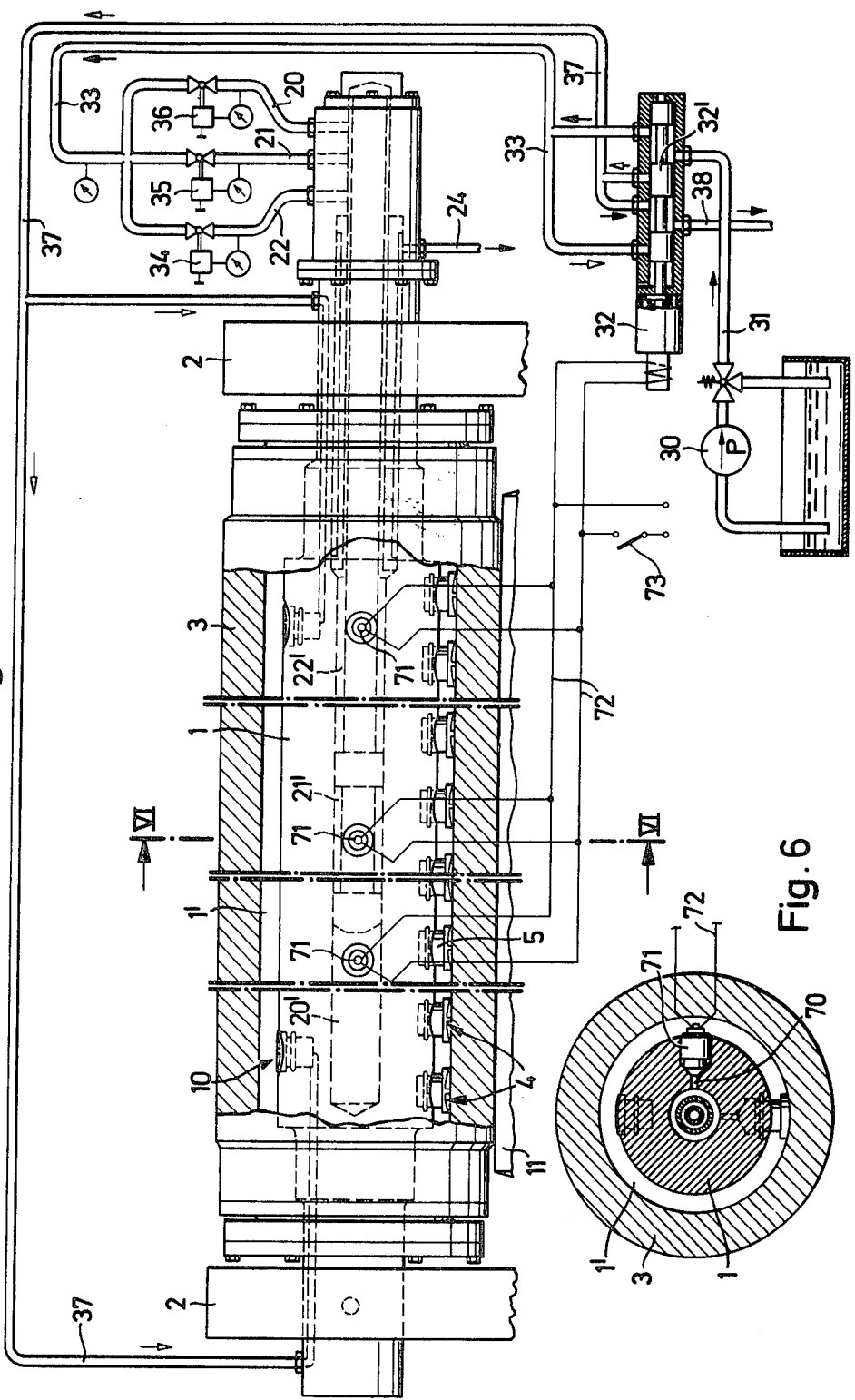
FIG. 5 is a fragmentary sectional view, corresponding to the showing of FIG. 1, of a further embodiment of controlled deflection roll together with the hydraulic and electric circuitry.
Figure 6:
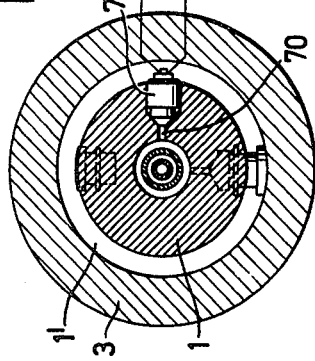
FIG. 6 is a cross-sectional view of the arrangement of FIG. 5, taken substantially along the line VI—VI thereof.

Now in FIGS. 5 and 6 there is illustrated a further exemplary embodiment of controlled deflection roll 5 which is somewhat modified in relation to the embodiment of FIGS. 1 to 3. As a matter of convenience in illustration and description the parts of the embodiments of FIGS. 5 and 6, which are the same or analogous to those of the controlled deflection roll of FIGS. 1 to 3, have been generally conveniently designated with the same reference characters.

The embodiment of FIGS. 5 and 6 differs from that of FIGS. 1 to 3 predominantly inasmuch as the hydraulic liquid, during the lifting action, does not flow back through the conduits or lines 20, 21 and 22, rather it is withdrawn out of the hollow spaces or chambers 20', 21' and 22 into which these conduits open, directly into the intermediate space 1' between the support 1 and the roll shell 3. For this purpose outflow channels 70 lead towards the outside from the hollow spaces or chambers 20', 21' and 22, and in which outflow channels there are arranged electromagnetic valves 71, as best seen by referring to FIG. 6.

As schematically illustrated in FIG. 5, the electromagnetic valves 71 are connected with an electrical line or conductor 72, which can be placed under current by actuating a switch 73. At the conductor 72 there is simultaneously also connected the electromagnetic winding or coil of the control valve 32.

If the roll shell 3 of the controlled deflection roll of the arrangement of FIGS. 5 and 6 should be lifted, then like with the previously discussed embodiments, the control valve 32 is switched by actuating the switch 73. Consequently, the contact or pressure elements 4 are disconnected from the infeed of the pressurized fluid medium and the lift-off elements 10 are connected with the infeed. At the same time, by means of the electrical signal appearing at the conductor or line 72 the electromagnetic valves 71 are opened, so that the oil which is located in the hollow spaces 20', 21' and 22 can flow out into the intermediate space or chamber 1' between the support 1 and the roll shell 3. The oil or hydraulic liquid flows out of the intermediate space 1' in conventional manner through the ring 25 and the channels 26, 23 into the outflow or drain line or conduit 24.

While there are shown and described present preferred embodiments of the invention, it is to be distinctly understood that the invention is not limited thereto, but may be otherwise variously embodied and practiced within the scope of the following claims. Accordingly,

What we claim is:

1. A controlled deflection roll arrangement comprising:
    a fixed support;
    a hollow shell;
    means mounting said hollow shell to be rotatable about the fixed support and displaceable relative to said fixed support in the direction of a pressure plane;
    at least one hydrostatic contact element disposed between the fixed support and the roll shell;
    a counter roll cooperating with said roll shell;
    said at least one hydrostatic contact element being operatively effective in the pressure plane and serving to press the roll shell against the counter roll and thus for producing a pressure force of the controlled deflection roll;
    at least one hydrostatic lift-off element which is effective in an opposite direction to the effective operative direction of the contact element and serving to lift-off the roll shell from the counter roll;
    means defining at least one source of hydraulic pressurized fluid medium;
    hydraulic lines for connecting the contact element and the lift-off element with said source of hydraulic pressurized fluid medium;
    an outflow conduit for the hydraulic pressurized fluid medium; and
    control means for selectively connecting a hydraulic line of the contact element or the lift-off element with said source of hydraulic pressurized fluid medium and for simultaneously connecting the hydraulic line of the element which has been disconnected from the source with an outflow conduit.

2. The controlled deflection roll arrangement as defined in claim 1, wherein:
    said control means comprises a control valve which flow communicates the source of hydraulic pressurized fluid medium and the outflow conduit with the hydraulic lines of the contact element and the lift-off element.

3. The controlled deflection roll arrangement as defined in claim 2, wherein:
    said control valve comprises an electromagnetically actuated valve unit.

4. The controlled deflection roll arrangement as defined in claim 1, further including:
    a plurality of said contact elements;
    each of said contact elements being connected by a separate hydraulic line with different sources of hydraulic pressurized fluid medium working at different pressures;
    a second control means conjointly actuatable with the first control means and serving for the simultaneous connection of the hydraulic lines of the contact elements with said outflow conduit defining a common outlet conduit and for the simultaneous disconnection of the hydraulic lines of the contact elements from said outflow conduit.

5. The controlled deflection roll arrangement as defined in claim 4, wherein:
    said second control means comprises a control valve which can be positionally adjusted by the first control means.

6. The controlled deflection roll arrangement as defined in claim 4, wherein:
    said second control means contains hydraulically actuated valve means;
    connection line means;
    said hydraulically actuated valve means being arranged in said connection line means;
    said connection line means leading from pressurized medium-line means to the outflow conduit and being maintainable by the pressure of the hydraulic pressurized fluid medium in closed position when such pressurized fluid medium is delivered to each said lift-off element.

7. The controlled deflection roll arrangement as defined in claim 1, further including:
    a conduit provided for said contact element;

at least one shutoff element for connecting said conduit of the contact element with the outflow conduit;

a channel leading from said conduit into an intermediate space between the support and the roll shell;

said shutoff element serving to selectively close an open said channel.

8. The controlled deflection roll arrangement as defined in claim 7, wherein:

said shutoff element is an electromagnetically actuatable shutoff element.

* * * * *